United States Patent [19] [11] 4,228,604
Cherian [45] Oct. 21, 1980

[54] BIORHYTHMIC DEVICE

[76] Inventor: Gabriel B. Cherian, 4200 Livingstone Dr., York, Pa. 17402

[21] Appl. No.: 949,887

[22] Filed: Oct. 10, 1978

[51] Int. Cl.³ .............................................. G09D 3/00
[52] U.S. Cl. ........................................ 40/107; 40/109; 40/117; 40/120; 40/546; 40/615; 235/89 R
[58] Field of Search ............. 40/120, 113, 111, 107 B, 40/107, 109, 489, 490, 491, 508, 509, 511, 512, 436, 437, 615, 546, 537; 33/1 B, 1 C, 1 SC, 1 SD; 35/24 A, 30, 31 B, 31 C, 31 D, 31 E, 34, 28, 41; 235/89 R; 116/286, 307

[56] References Cited

U.S. PATENT DOCUMENTS

| | | | |
|---|---|---|---|
| 1,542,743 | 6/1925 | Stevenson | 283/2 X |
| 2,203,244 | 6/1940 | White | 40/577 X |
| 2,779,107 | 1/1957 | Brace | 40/491 X |
| 2,914,865 | 12/1959 | Hall | 40/491 X |
| 3,248,809 | 5/1966 | Stifano | 40/491 X |
| 4,035,616 | 7/1977 | Piringer | 40/107 |
| 4,140,895 | 2/1979 | Tatai | 40/107 |
| 4,144,446 | 3/1979 | Sanders | 235/89 R |

FOREIGN PATENT DOCUMENTS 2301860  7/1974  Fed. Rep. of Germany ............. 283/2

OTHER PUBLICATIONS

Bulch, Jennifer, "Biorhythms: A Key to Your Ups and Downs", Readers Digest, Sep. 1977, p. 63.

Primary Examiner—Louis G. Mancene
Assistant Examiner—G. Lee Skillington
Attorney, Agent, or Firm—Allan B. Osborne

[57] ABSTRACT

A biorhythmic cycle indicator having three, sine-wave-contoured plates that slidingly overlay a backing plate that has a calendar strip. The plate contours and the calendar register to provide a graphic representation of a person's biorhythmic cycle.

The contours of the sliding plates are illuminated to accent the component cycles.

1 Claim, 11 Drawing Figures

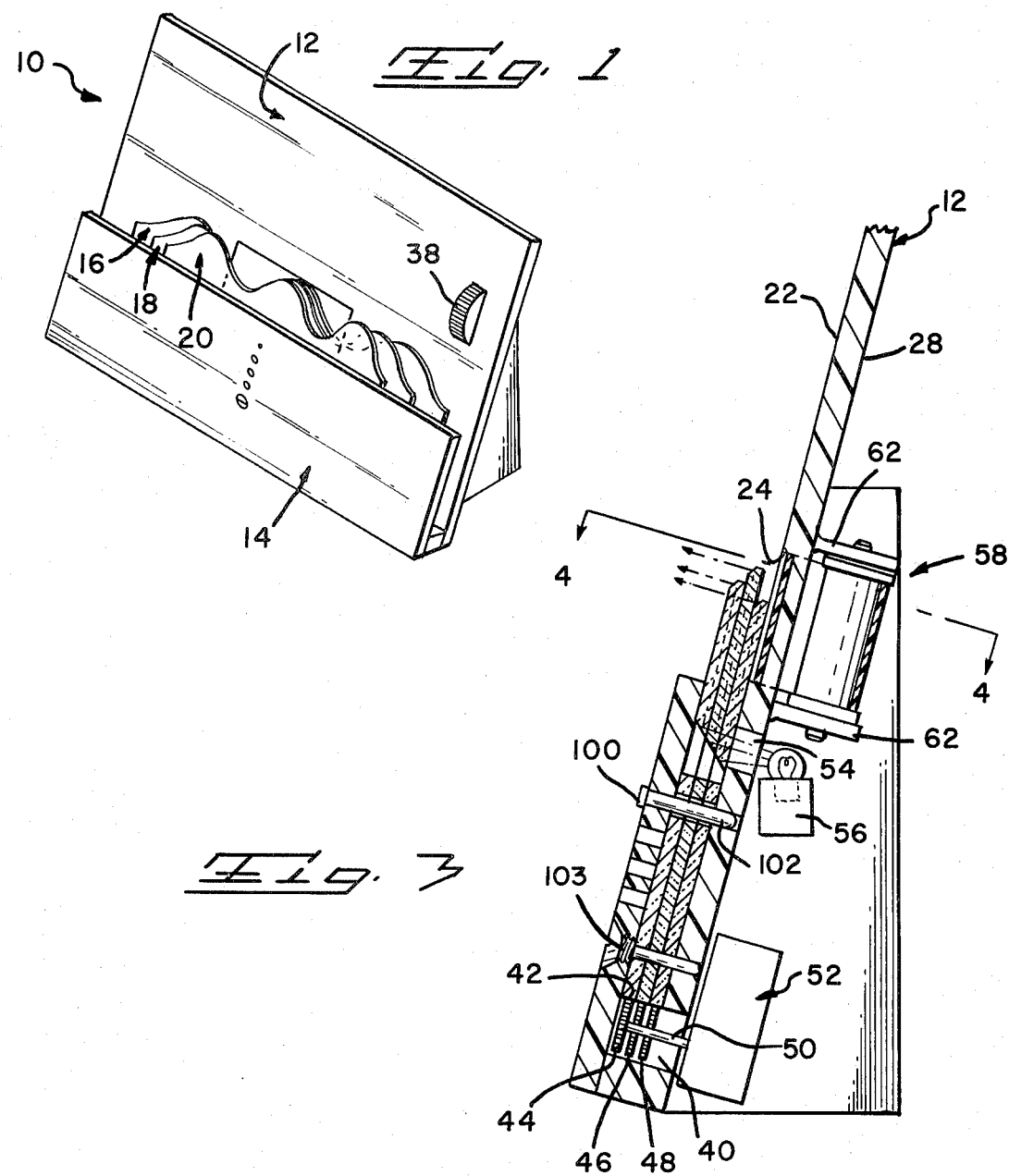
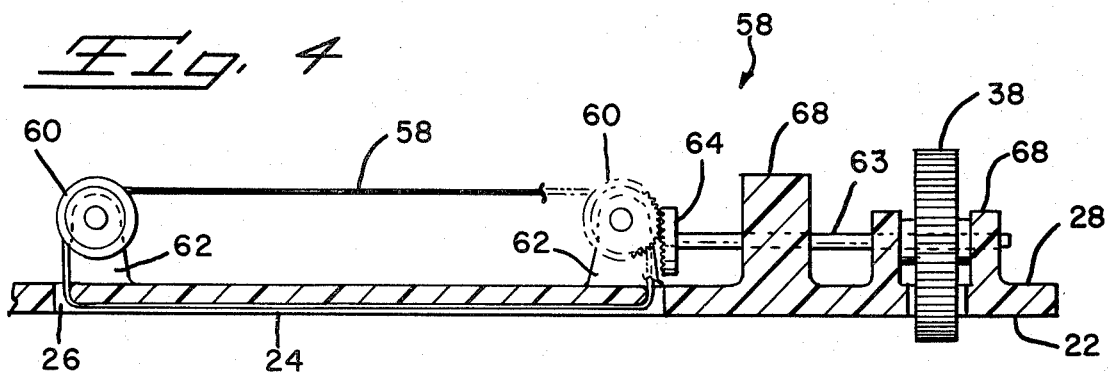

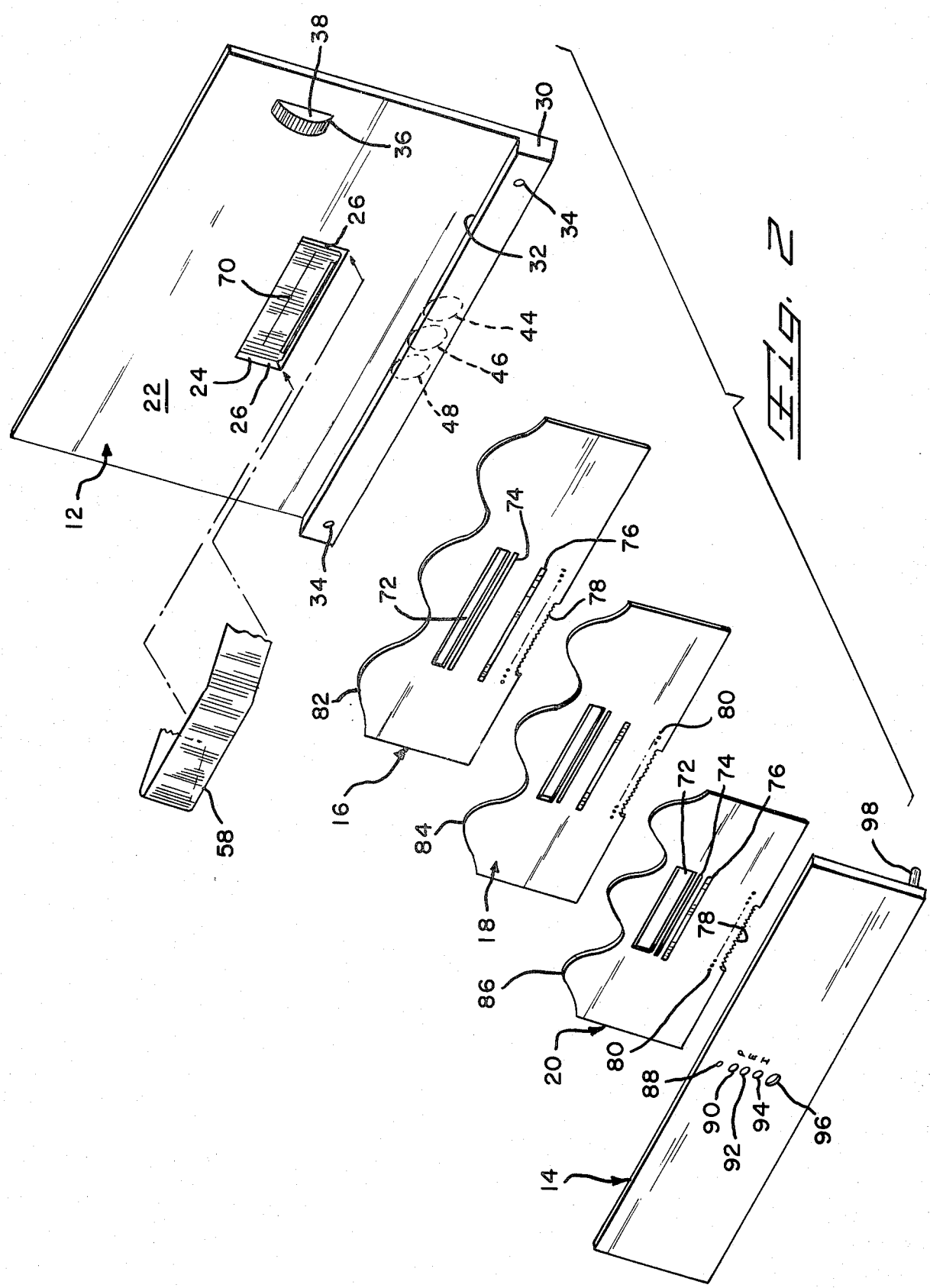

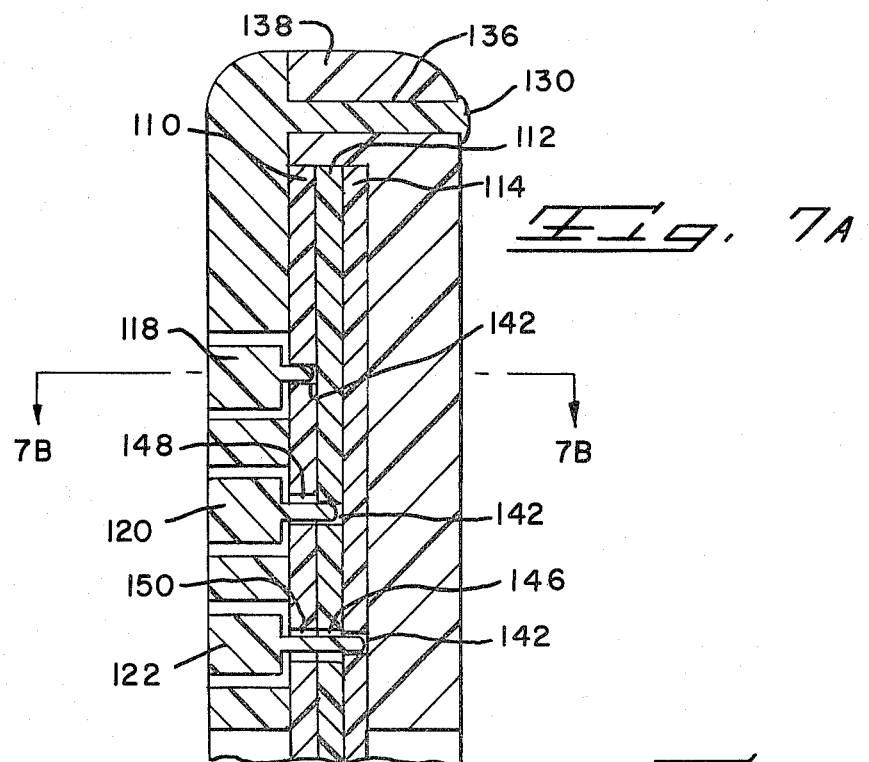
Fig. 7A
Fig. 7B
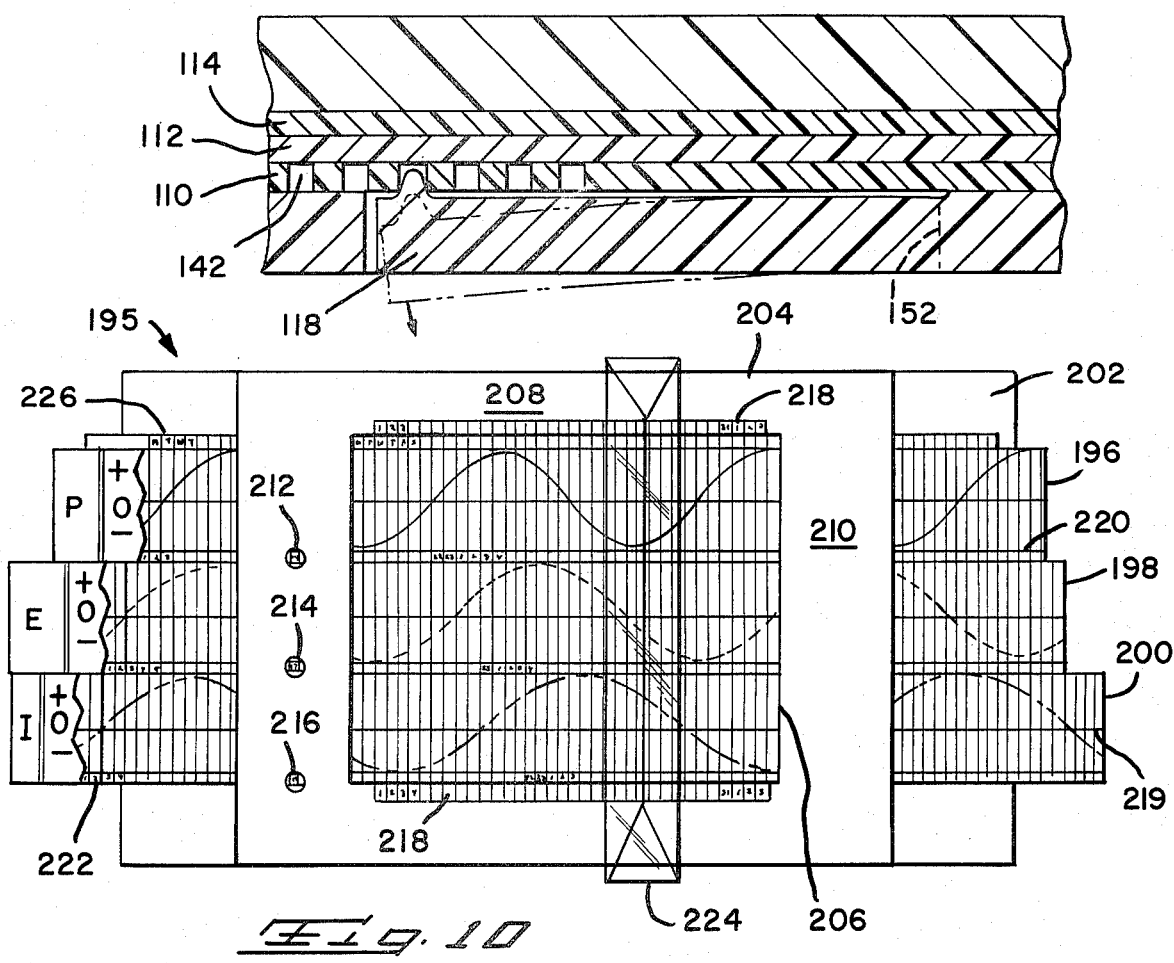
Fig. 10

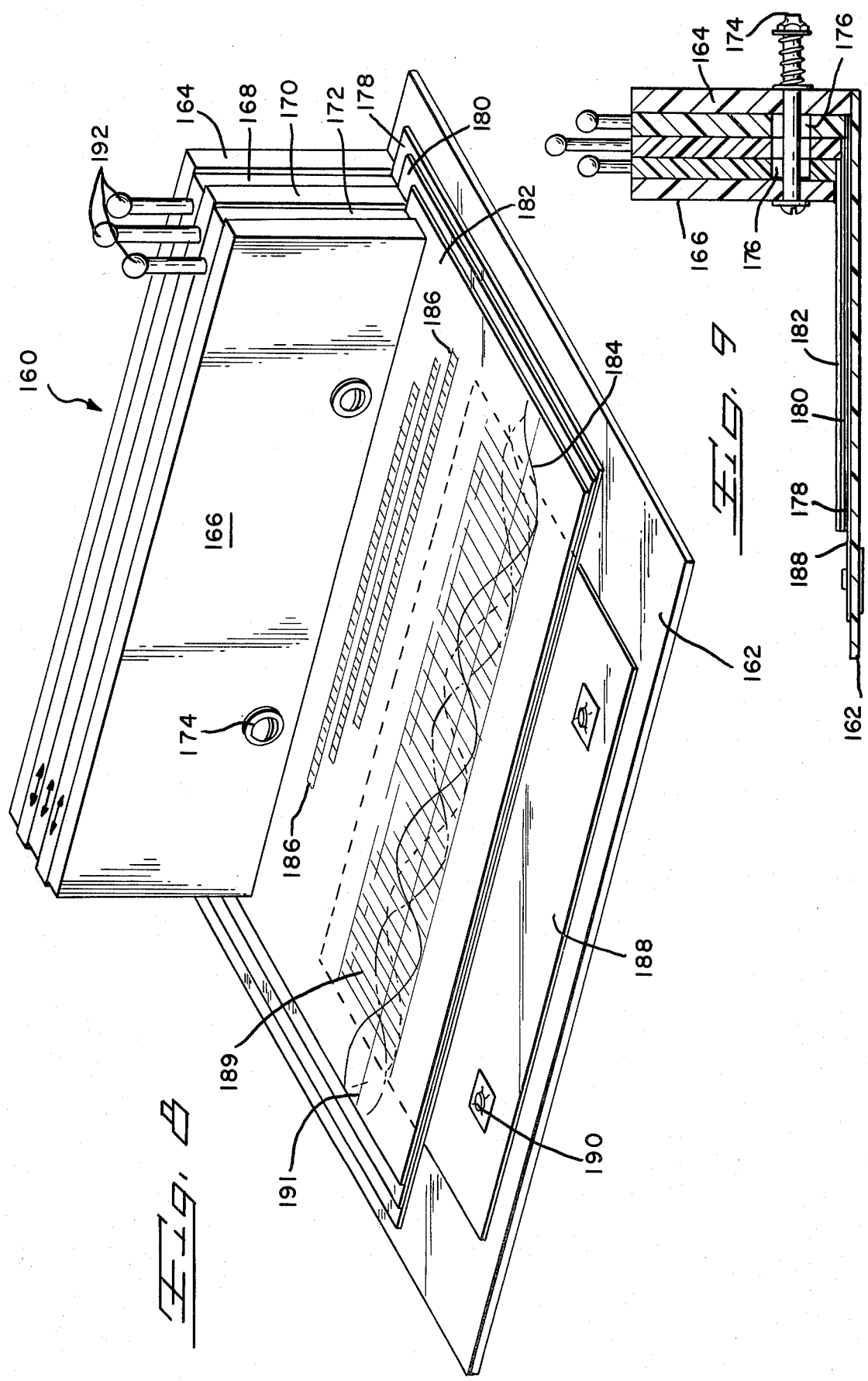

BIORHYTHMIC DEVICE

BACKGROUND OF THE INVENTION

It has long been suspected that humans are subjected to behavior cycles. In the late nineteenth century and since, numerous men of medicine and science have studied human behavior with the result that at least three distinct cycles have been observed. These cycles are a physical cycle having a twenty-three day period, an emotional cycle having a twenty-eight day period and an intellectual cycle having a thirty-three day period. Each cycle is vertically divided into "highs" and "lows" with the cycle crossing a "zero" line twice during each period. From the observations and studies, it has been concluded that a person feels his best when such cycles are above the zero line; i.e., a "high"; and feels down when the cycles are below the zero line; i.e., a "low". Further, a substantial amount of data indicates that those days on which the cycles are crossing the zero line, regardless of whether the cycle is heading towards a high or a low, can be very precarious; i.e., a critical period of time. Accordingly, during such critical periods one would be well advised to use more than casual care in his daily activities.

Such views with respect to biorhythms have received considerable support by various companies. For example, one airline company discourages pilots from flying during their 'critical' days.

1. Field of the Invention

This invention is in the field of devices graphically displaying biorhythmic cycles against a time period background.

2. Prior Art

Prior art devices related to the present invention include a circular slide-rule device on which one can plot and display his three biorhythm cycles.

SUMMARY OF THE INVENTION

The present invention includes three sliding members, each having in some manner a cycle of a given length. The sliding members or simply "sliders" are positioned either one over the other or in juxtaposition, on a back plate on which is contained a given time period subdivided into days. Means are also provided for indexing each slider so that a person can determine for each day the precise position of each of his three biorhythm cycles.

BRIEF DESCRIPTION OF THE DRAWINGS

FIG. 1 is a perspective view of a table-top device of the present invention constructed in accordance with one embodiment;

FIG. 2 is an exploded view of the embodiment of FIG. 1;

FIG. 3 is an elevational cross-sectional view of the embodiment of FIG. 1;

FIG. 4 is a view taken along lines 4—4 in FIG. 3;

FIG. 7A is a cross-sectional view taken along lines 7A—7A in FIG. 5;

FIG. 7B is a cross-sectional view taken along lines 7B—7B in FIG. 7A; and

FIGS. 8 through 10 illustrate two other embodiments of the present invention.

DESCRIPTION OF THE INVENTION

Figure 5:
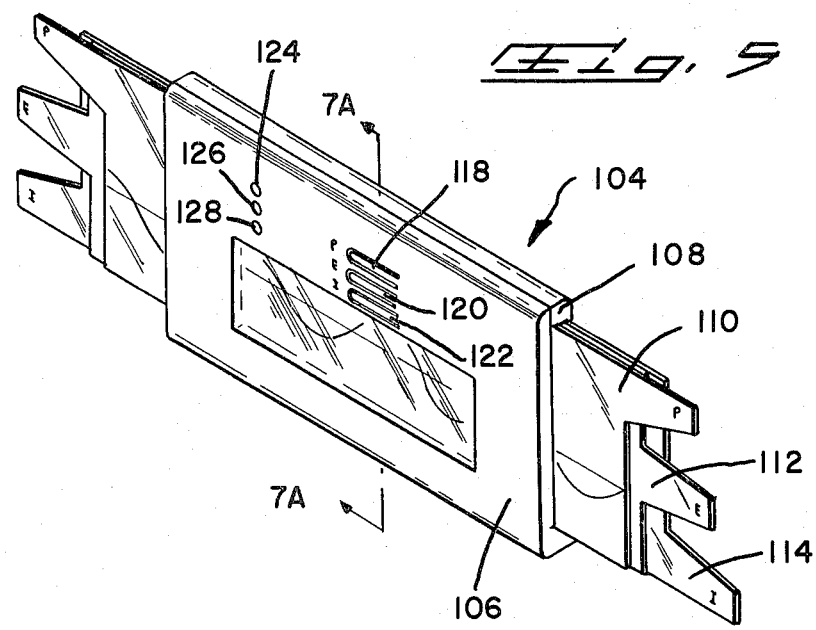
FIG. 5 is a perspective view of another embodiment of the present invention.

The display device 10 shown in FIGS. 1–3 includes a back plate 12, front plate 14 and three biorhythm sliding members 16, 18 and 20.

As better seen in FIG. 2, plate 12 has, in the upper center of front surface 22 a rectangular recess 24. Vertical slots 26, one at each end of the recess, extend through the plate to its back surface 28.

The plate has on its front surface a thick section running along the lower edge or base. This thicker section, indicated by reference numeral 30, provides an upwardly facing ledge 32. Two holes 34 extend through the thicker section, one hole near each end.

An aperture 36 is provided in the upper right hand corner of the back plate through which protrudes a thumb wheel 38.

FIG. 3 shows in profile the display device 12 of FIG. 1.

An elongated cavity 40 is located in the thicker section just above the base of back plate 12 with it opening out onto the plate's back surface. The cavity extends into section 30 where an elongated window 42 in ledge 32 communicates therewith. Three toothed gears 44, 46 and 48, each attached to a separate driving spindle 50 (only one of which is shown) are located in the cavity in side-by-side relation with the tops of the gears protruding through window 42 just above the surface of ledge 32. FIG. 2 shows the gears so protruding.

Spindles 50 are connected to driving means 52 which may be a microprocessor coupled to some motor means. Alternative driving means include any conventional means capable of turning the spindles and gears 44, 46 and 48 as required. Yet another alternative driving means is a thumb wheel attached to the back of each spindle for manual driving.

A window 54 may be provided through the back plate with light source 56 therebehind.

A time period display and positioning means 58 will now be described with reference principally to FIG. 4. The drawing in FIG. 4 is a view along lines 4—4 in FIG. 3.

The aforementioned recess 24, located on the front surface 22 of plate 12, is the portion of the positioning means for displaying a time period in units of days. The time period is on an endless tape 58 which, as shown in FIG. 4, passes across the face of the recess, through slots 26 and around reels 60. The reels are supported, top and bottom, by brackets 62 (FIG. 3).

Means for driving the reels include a shaft 63 and a toothed gear 64 coupled to the aforementioned thumb wheel 38. Gear 64 meshes with teeth 66 on the adjacent reel 60. Suitable supports and bushings are provided for the shaft as generally indicated by reference numeral 68.

Other means for driving the reels include a thumb wheel (not shown) connected directly to a reel.

Tape 58, which is shown in part in FIG. 2, is, in fact, a calendar of several months. The days are represented by the spaces between vertical lines. The date may be shown in each space as well as the day of the week. Additionally, each Saturday and Sunday may be shaded to provide easy ascertainable reference points. Although size prohibits detail, the vertical lines are discernable. Also the description and drawing relative to FIG. 10 will be helpful in this matter.

If tape 58 is of transparent material, a horizontal line may be provided on the face of recess 24 as indicated by reference numeral 70 in FIG. 2. The line is so positioned that the days on the tape are divided into upper and lower regions. An opaque tape would have to have the line thereon. This horizontal line is referred to as the "zero" line.

In FIG. 2, the three biorhythm sliding members or sliders 16, 18 and 20 are shown. The structures common to all three sliders include a light deflecting slot 72, retention slot 74, keying index 76 and a set of teeth 78 recessed in the lower edge of each slider.

Additionally, there are a series of holes 80 extending across the sliders horizontally. These holes are located an equal distance above the set of teeth on each slider.

The above-mentioned keying index 76 consists of a series of boxes each having the same width as the spaces representing days on tape 58. Each box is numbered, beginning with one on the left side and ending with the number of the last day of the cycle period for that particular slider; e.g., twenty-three, twenty-eight or thirty-three. The spacing of the boxes corresponds to the spacing of the holes 80.

The top edge of each slider is scalloped as shown generally by reference numerals 82, 84 and 86. The scalloping is a uniform sine wave contour with the cycle for slider 16 being equal to thirty-three spaces; i.e., days, on tape 58; for slider 18 the period is twenty-eight spaces or days; and for slider 20 the period is twenty-three spaces or days. These waves represent the aforementioned biorhythmic cycles where the thirty-three day cycle is equated to one's intellectual behavior; the twenty-eight day cycle is equated to one's emotional behavior and the twenty-three day cycle is equated to one's physical behavior.

In summary, the days on tape 58, the boxes forming index 76 and the holes 80 are all on equal linear spacing and such spacing provides the units of length for the cycles on the top edge of the sliders. Obviously, the spacing is arbitrarily chosen but it must be constant throughout one device.

With respect to the light deflecting slots 72, attention is directed to the side view shown in FIG. 3. The upper wall of each is angled so as to reflect light from light source 56 upwardly to emit the light from out the top edge of each slider. The slots increase in size from back to front so as not to interfere with the neighboring slider.

The keying indexes 76 are positioned at a different vertical location between slots 74 and holes 80. The index on slider 16 is immediately above the row of holes while it is immediately below the slot 74 on slider 20. The index on slider 18 is intermediate the two reference points.

With reference to FIG. 2 again, attention is directed to front plate 14. It has five holes, the top one being hole 88, second hole 90, third hole 92, fourth hole 94 and bottom hole 96. Additionally, two pegs 98 (only one can be seen) project rearwardly from the plate's back surface at either end near the base.

With reference to FIG. 3 the assembly of the device will now be explained. The three slides are positioned on ledge 32 with slider 16 against plate 17, slider 18 next and slider 20 on the outside. Front plate 14 is placed over the sliders with its pegs 98 being received in holes 34.

With this assembly, teeth 78 on sliders 20, 18 and 16 engage toothed gears 44, 46 and 48 respectively. A pin 100 extends through the top hole 88 in plate 14, through the retaining slots 74 in each of the three sliders and into a hole 102 in back plate 12. This holds the three sliders in the device.

Holes 90, 92 and 94 in plate 14 are now in direct alignment with indexes 76 on the sliders; hole 90 being in alignment with the index on slider 20; hole 92 with the index on slider 18 and hole 94 with the index on slider 16. Further, the series of holes 80 in each slider are in alignment with hole 96. Thus peg 103 may be received in holes 96 and 80.

The sliders; i.e., sliding members, are so positioned against the back plate that the cycles are in front of and in registration with the time period on tape 58. As is well known, the cycles, when horizontally bisected by the zero line, have two sections; a positive section above the zero line and a negative section below the zero line. Further, there is a transition point which is the point where the cycle crosses the zero line, irrespective of whether the cycle is entering the positive section or the negative section. Thus, the placing of the sliders must be such that zero line 70 must bisect the cycles evenly in a vertical sense. In this way the positive sections will be in alignment with the upper regions of the day spaces and the negative sections will be in alignment with the lower regions. The user of device 10 or the other embodiments to be described below, will be able to readily ascertain whether he is in a "high", "low" or a critical day.

Figure 6:
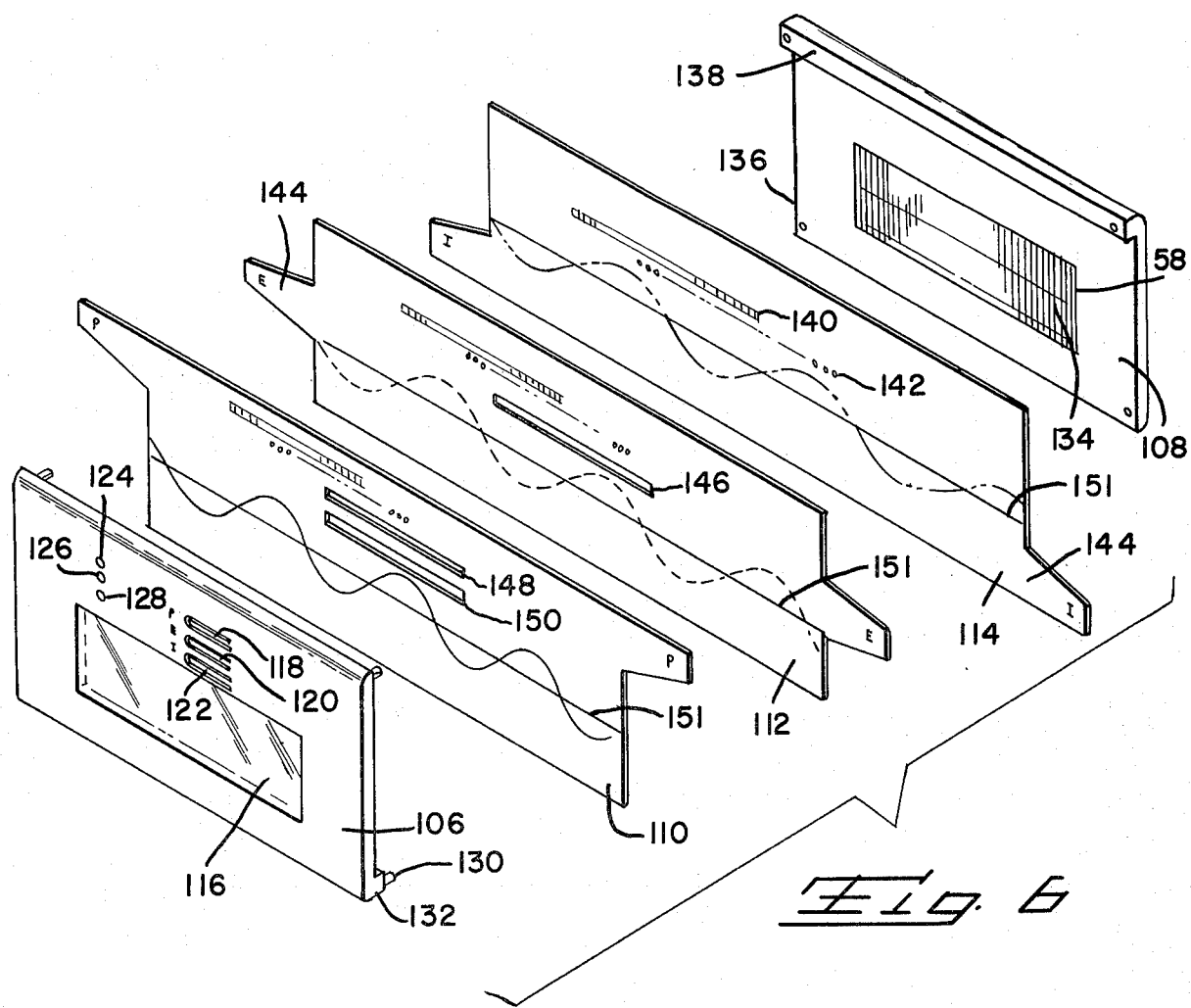
FIG. 6 is an exploded view of the embodiment of FIG. 5.

FIGS. 5, 6 and 7 disclose an alternative embodiment of the biorhythmic device. Shown therein is device 104 which consists of front and back plates 106 and 108 respectively, and three sliding members or sliders 110, 112 and 114, of transparent material.

With reference to FIG. 6, the construction of device 104 is clearly shown. Front plate 106 has a large window 116 which may be open or covered with a transparent material. Above the window are three peg-carrying flaps 118, 120 and 122 integrally hinged to the plate. FIG. 7 shows the pegs on the flaps clearly.

To the left of the flaps are three vertically arranged observation holes 124, 126 and 128.

The back surface of plate 106 has a peg 130 at each corner and further a rearwardly projecting foot 132 at its lower surface.

Back plate 108 has a section of tape 58 removably secured to its front surface. This tape includes a horizontal line 134; i.e., a zero line, dividing the tape into upper and lower regions. In addition, the back plate has a hole 136 at each corner and a forwardly projecting foot 138 at its upper surface.

Each of the three sliders have in common a keying index 140, a series of holes 142 below the index, and tabs 144 at each end.

Index 140 is identical to index 76; i.e., it consists of a series of boxes on the same spacing as the days on the time tape 58 and as the series of holes 142. Each index is numbered to reflect the cycle period on the particular slider; i.e., twenty-three, twenty-eight and thirty-three days.

As the drawing shows, the relative position of the index and holes varies vertically between the sliders.

In addition, slider 112 has one elongated slot 146 and slider 110 has two elongated slots 148 and 150.

Each slider has a biorhythmic cycle printed thereon in an opaque substance. The cycle on slider 110 repeats itself every twenty-three days, such days being of the same horizontal length as on tape 58 and on index 140.

The cycle is twenty-eight days on slider 112 and thirty-three days on slider 114. The cycle on slider 110 is a solid line, a dashed line on slider 112 and alternating dots and dashes on slider 114. A horizontal or zero line 151 bisects the cycles.

In assembling ruler 104 the sliders are slidably positioned between the two plates with the feet 132 and 138 providing lengthwise support and confinement. Pegs 130, received in holes 136 removably secure the assembly.

Referring to FIG. 7A, one sees that the peg on flap 118 fits into one of the series of holes 142 on slider 110. The peg on flap 120 passes through slot 148 on slider 110 and is received in one hole of the series on slider 112. The peg on flap 122 passes through slot 150 on slider 110, slot 146 on slider 112 and is received in a hole in the series on slider 114.

FIG. 7B is a view looking down on the peg of flap 118 to show how it may be moved out of a hole to allow the slider to move left or right. The view also demonstrates the integral hinge 152 of the flap and its deflected position indicated by the dashed line. The flexibility of the flaps is a function of the material used and the dimensions. One preferred material is polypropylene. Spring steel may also be used. The flaps may also be separate components, being joined to the plate by some means, such as riveting.

Still another embodiment is shown in FIGS. 8 and 9. This device, indicated generally by reference numeral 160, consists of a transparent or translucent, rigid base plate 162 and a first vertical plate 164 fixed to and at one end of plate 162. A second vertical plate 166 is spaced from and connected to the first plate 164. The two plates provide vertical support for three sliding plates 168, 170 and 172. As seen in FIG. 9, spring-loaded bolts 174 confine the sliding plates. Elongated slots 176 permit the plates to be moved left or right. As is apparent, the plates in device 160 are the equivalent to the sliders in devices 10, 104 and 195 (FIG. 10).

Each of the three sliding plates 168, 170 and 172 have fixed to their bottom surface a somewhat rigid, transparent sheet, indicated by reference numerals 178, 180 and 182 respectively. As shown, these sheets are at right angles to the plates such that they project over the surface of base plate 162. The sheets each have a separate biorhythmic cycle 184; i.e., a twenty-three day cycle on sheet 178, a twenty-eight day cycle on sheet 180 and a thirty-three day cycle on sheet 182. As with the cycles on sliders 110, 112 and 114, the cycles are represented by solid, dashed and dot-dash lines to distinguish them. Below each cycle is an index 186 with the numbers corresponding to the number of days in each cycle. Index 186 is identical to indexes 76 and 140.

A time chart 188 very similar to the aforementioned tape 58; i.e., a period of time 189 with the spaces between vertical lines representing the days, is positioned on base plate 162 underneath the three transparent sheets. Suitable means such as shown by reference numeral 190, removably hold the time chart to the plate. A horizontal or zero line 191 divides the vertical spacer or days into upper and lower regions.

Each of the sliding plates have some means for moving them. Shown ae knobs 192 fixed on the upper edge of the plates. Other devices may be used.

The plates are so dimensioned that the biorhythmic cycles thereon overlie the zero line 191 such that each cycle crosses it twice during the particular time period; i.e., twenty-three, twenty-eight or thirty-three days.

Device 160 is well suitable for being used with a projector of the type which transfers the information; i.e., cycles and time period, onto a wall or screen in a greatly enlarged image.

FIG. 10 shows still another embodiment similar to the one in FIGS. 5 and 6. In this embodiment, hereinafter referred to as device 195, the three sliding members or sliders, 196, 198 and 200, are arranged one next to the other rather than overlying one another. The three are slidably positioned between back and front plates 202 and 204 respectively. The front plate 204 has a central window 206 defined by horizontal sides 208 and vertical sides 210. A series of three holes 212, 214 and 216 are provided in the left hand horizontal side. A month is represented by a series of numbered spaces, indicated by reference numeral 218, located along each horizontal sides 208 adjacent window 206. The first day of the month; i.e., number one, is at the left hand side and the last day of the longest month; i.e., thirty-one, is near the right hand side. The numbering begins over again with one. No more than three or so spaces beyond number thirty-one need be provided and even thirty-one would be sufficient.

The three sliding members are similar except for the biorhythm cycle. The cycle on slider 196 is the physical cycle of twenty-three days; slider 198 shows the emotional cycle of twenty-eight days period and the intellectual cycle of thirty-three days in on slider 200.

Each slider is divided into horizontal spaces by vertical lines and the horizontal spaces are divided into upper and lower regions by the horizontal or zero line 219. A second horizontal line, such as indicated by reference numeral 220 at the bottom of slider 196, provides a series of boxes, indicated by reference numeral 222 on slider 200, the numbers represent the cycle's period; i.e., twenty-three days for slider 196, twenty-eight days for slider 198 and thirty-three days for slider 200. This, of course, is the index identical to indexes 76, 140 and 186. Number one in each box correspond to the point where the cycle leaves the zero line and starts to rise into the upper region; i.e., the beginning of the period. The last number; i.e., twenty-three, twenty-eight or thirty-three, corresponds to the day the cycle is completed. As can be seen, however, the location of those boxes is such that number one therein shows in the appropriate hole, 212, 214 and 216 when the start of the cycle is in alignment with the first day of the month. In other words, the numbering in the index must be ahead of the cycle equal to the physical distance between the observation holes and the first day of the month indicated by reference numeral 218.

Device 195 is further supplied with a vertical hairline 224 which can be moved back and forth across the face of window 206.

Further, a sliding member 226 is provided immediately above slider 196. This member is divided into boxes with the first letter of each day of the week printed therein. The user slides this member so that week day corresponds to the proper day of the month shown in time period 218.

The method of using the several devices described above first requires the finding of where to set each cycle on the first day of time period 58. This day is generally the first day of a month; e.g., Sept. 1. Since a person's biorhythmic cycles start on the day of his birth, one needs to calculate the days he has lived. This number is divided by twenty-three, twenty-eight and thirty-three to determine the number of elapsed cycles with the remainder being in each case the number of days the cycle is in currently. For example, assume a person has lived exactly 10950 days as of the first day of the given month. This number, divided by twenty-three, shows that 476 physical cycles have been completed and he is in the second day of the 477th cycle. Accordingly, he moves the physical slider so that the second day into the cycle is aligned with the first day of the month. In the case of device 10, he moves slider 20 so that the number two in its keying index 76 appears in hole 90. With respect to device 104, he moves slider 110 until the number two in its index 140 shows in hole 124. In the case of device 160, sheet 178 is moved so that number 2 in its index 186 overlies the space representing the first day of the month. For device 195, slider 196 is moved until member 2 in its index 222 appears in hole 212.

The same operation applies with respect to the other two cycles. In device 10, the sliders are held in the correct position by peg 103. Thereafter the user needs only to move tape 58 via thumb wheel 38 from time to time to provide new monthly periods. The sliders may also be moved by driving means 52 and gears 44, 46 and 48. Of course, peg 103 must be omitted.

In device 104 flaps 118, 120 and 122 must be pulled back to free the sliders from the pegs. Once the sliders are positioned correctly, the flaps are released so that the pegs enter the holes and hold the sliders in that position.

As device 160 is more suited for use with a projector, means for holding the plates in one position is not desirable. However, securing means may be added if needed.

Device 195 also does not have specific securing means. However, friction suffices to hold the sliders. Of course, securing means can also be added.

With respect to device 195, after the sliders are correctly positioned, the user simply moves hairline 224 each day to determine the location of the three cycles for that day.

Other embodiments should now be apparent. For example, with respect to devices 10, 104 and 195, the structure can be round; i.e., the sliding members or sliders are continuous or endless in the shape of loops. The support member or back plate 12 is an elongated cylinder with the various gears and driving means positioned within. The sliders encircle the cylindrical back plate. At the location of the time period, the structure could be flattened somewhat for viewing. Further, a cylindrical device such as described above could include a fourth loop on which would be a time period. Driving means, whether motorized or manual, would move all three sliding members and the time loop synchronously. This embodiment would lend itself well as a base for a table lamp, for example.

As many possible embodiments may be made of the invention without departing from the spirit or scope thereof, it is to be understood that all matters herein set forth or as illustrated in the accompanying drawings are to be interpreted as illustrative and not in a limiting sense.

What is claimed is:

1. A biorhythmic device comprising:
   a. a back plate having a front surface that displays indicia depicting a time period divided into days with said days being represented by spaces defined by spaced vertical lines, said indicia further comprising a horizontal line dividing the spaces into upper and lower regions;
   b. three sliding members, each comprising a translucent sheet having a lower edge and an upper edge, said upper edge having a sine wave contour of a different biorhythmic cycle; said sliding members overlay each other and the back plate such that the sine wave contours overlay the time period indicia, said sliding members are slidable, in relation to the other members and the back plate, in the direction of the horizontal line, thus providing means to define positive and negative regions and transition points on the cycles; and
   c. means for edge illuminating the sine wave contours comprising:
   a light source on the back plate,
   means, on the sliding plates, for introducing light from the light source into the sliding member, and means, on the upper edge, for emitting the light introduced into the sliding member.

* * * * *